UNITED STATES PATENT OFFICE.

MAXIMILIAN SCHARFF AND FRANZ SLAMA, OF LUDWIGSHAFEN-ON-THE-RHINE, GERMANY, ASSIGNORS TO THE BADISCHE ANILIN UND SODA FABRIK, OF LUDWIGSHAFEN-ON-THE-RHINE, GERMANY, A CORPORATION OF BADEN.

PROCESS OF REMOVING ARSENIC FROM GASES.

No. 798,302. Specification of Letters Patent. Patented Aug. 29, 1905.

Application filed June 3, 1903. Serial No. 159,965.

*To all whom it may concern:*

Be it known that we, MAXIMILIAN SCHARFF, a subject of the King of Saxony, and FRANZ SLAMA, a subject of the Emperor of Austria-Hungary, doctors of philosophy and chemists, residing at Ludwigshafen-on-the-Rhine, in the Kingdom of Bavaria, Empire of Germany, have invented new and useful Improvements in the Purification of Gases from Arsenic, of which the following is a specification.

This invention relates to the purification of gases from arsenic, more especially but not exclusively of such gases as are intended for the manufacture of sulfuric acid by the contact process.

We have discovered that certain granular or porous materials infusible and incombustible at the temperature employed are capable of removing from burner-gases coming from pyrites-burners not only the flue-dust, and with it such arsenic as at ordinary temperature is present in the form of dust, but also the arsenic-vapors present in hot burner-gases. We have further discovered that the purifying or filtering power of these materials is considerably greater at an elevated temperature than when cold—for example, unburnt clay at a temperature of from three hundred and fifty to four hundred degrees centigrade (350°–400° C.) is from twenty to thirty (20–30) times more effective as a purifying or filtering agent than it is at ordinary temperature.

Granular or porous materials which are suited for the purposes of our invention are clay, (preferably unburnt,) kieselguhr, pumice-stone, coke, granulated fire-brick, iron furnace-slag, sulfates and phosphates and silicates of the alkalis, alkaline earths, magnesium, aluminium, the heavy metals, and especially such porous bodies as can be obtained according to the specification of British Letters Patent No. 6,828 of 1901 and the German Patents Nos. 102,244 and 127,846 and the like.

The process which we have founded on the above-mentioned discoveries consists in bringing the gases to be purified into intimate contact with the above-mentioned materials by passing them over or through the same at an elevated temperature, preferably at or over a temperature of two hundred degrees centigrade, (200°.) By this means in addition to the arsenic other impurities which are deleterious in the contact process can be removed from gases.

Although this process is especially intended for the purification of burner-gases, such as are intended for the manufacture of sulfuric acid by the contact process, other sulfurous gases containing arsenic can be purified in this way, and the purified gases obtained can also be employed for other technical purposes.

The following is an example of a way in which our invention can be carried into practical effect; but our invention is not limited to this example: Fill a brick-lined tower provided at the lower end with a grating of iron or stone with pieces of broken brick of a size of from one to three (1–3) inches cube and pass the gases which are to be purified in an upward direction through the tower. The gases on entering the tower should possess a temperature of from three hundred and fifty to four hundred degrees centigrade (350°–400° C.) and should have been previously passed through a dust-collecting chamber for the purpose of cooling them to this temperature and of allowing the larger solid particles to deposit. From time to time the undermost portion of the material should be removed from the lower part of the tower and an equal quantity of fresh material be introduced at the upper part of the tower, so as to avoid choking. The depth of material which should be used depends to some extent upon the velocity of the gases to be purified and the degree of purity which it is desired they shall attain. The issuing gases should be tested from time to time to ascertain whether the desired purification has been effected, and if it has not been then either a greater depth of filtering material should be used or the velocity of the gases should be diminished.

Instead of broken brick other natural or artificial, granular, or porous bodies—such as balls of burnt or unburnt clay or pieces of pumice-stone or the like—can be used.

Although we have mentioned a tower which is assumed to be vertical, it is not essential that such a tower should be used, as, if desired, a horizontal or an inclined container or shaft may be employed.

As will be apparent, we regard substances which are granular or porous as equivalents, and it is in this sense that the word "granular" is used in the following claims.

We claim—

1. The process of purifying sulfurous gases containing arsenic, by passing them at an elevated temperature between 200° and 400° centigrade over infusible and incombustible granular bodies, thus removing the arsenic while retaining the gases in an unconverted condition.

2. The process of purifying sulfurous gases containing arsenic, by passing them at an elevated temperature between 200° and 400° centigrade over granulated clay thus removing the arsenic while retaining the gases in an unconverted condition.

In testimony whereof we have hereunto set our hands in the presence of two subscribing witnesses.

MAXIMILIAN SCHARFF.
FRANZ SLAMA.

Witnesses:
ERNEST F. EHRHARDT,
JACOB ADRIAN.